(12) United States Patent
Levy et al.

(10) Patent No.: US 12,282,588 B2
(45) Date of Patent: Apr. 22, 2025

(54) SYSTEM AND METHOD FOR MANAGING USE OF STORAGE IN DISTRIBUTED SYSTEMS

(71) Applicant: Dell Products L.P., Round Rock, TX (US)

(72) Inventors: Shoham Levy, Karkur (IL); Drew P. Tonnesen, Bedford, NH (US); Dan Aharoni, Brookline, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 264 days.

(21) Appl. No.: 18/157,259

(22) Filed: Jan. 20, 2023

(65) Prior Publication Data

US 2024/0249031 A1 Jul. 25, 2024

(51) Int. Cl.
*H04L 67/60* (2022.01)
*G06F 21/62* (2013.01)
*G06F 21/78* (2013.01)

(52) U.S. Cl.
CPC .......... *G06F 21/78* (2013.01); *G06F 21/6227* (2013.01)

(58) Field of Classification Search
None
See application file for complete search history.

(56) References Cited

U.S. PATENT DOCUMENTS

| | | | |
|---|---|---|---|
| 10,409,838 B1 * | 9/2019 | George | G06F 3/0635 |
| 11,481,261 B1 * | 10/2022 | Frandzel | G06F 9/4881 |
| 11,503,031 B1 * | 11/2022 | Hu | H04L 67/1097 |
| 2012/0254982 A1 * | 10/2012 | Sallam | G06F 21/566 |
| | | | 726/16 |
| 2019/0179564 A1 * | 6/2019 | Bernat | G06F 3/0631 |
| 2021/0019091 A1 * | 1/2021 | Coleman | G06F 9/4881 |
| 2022/0027051 A1 * | 1/2022 | Kant | G06F 3/0617 |

* cited by examiner

*Primary Examiner* — Christopher B Robinson
(74) *Attorney, Agent, or Firm* — WOMBLE BOND DICKINSON (US) LLP (57) ABSTRACT

Methods and systems for managing storage of data are disclosed. To manage data storage, one or more access management frameworks may be used. One of the access management frameworks may be a storage array side framework that limits access to data based on user reservations. The user reservations may indicate the data subject to access limitation, the entity that requested the user reservation, and the extent of the access limitation. The user reservations may be used by the storage array to process receive input-output.

20 Claims, 5 Drawing Sheets

SYSTEM AND METHOD FOR MANAGING USE OF STORAGE IN DISTRIBUTED SYSTEMS

FIELD

Embodiments disclosed herein relate generally to data storage management. More particularly, embodiments disclosed herein relate to systems and methods to manage access limitations to manage data storage processes.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data storage. When data storage operations (e.g., reads/writes) are performed, the data available to a system may be modified. Some processes may rely on having access to data for long durations of time.

For example, in the context of data backup, processes for generating snapshot or other types of data structures usable to perform data recoveries may rely on having access to static data for a predetermined amount of time. If the data is modified during these processes, then the processes may not complete successfully.

To manage data storage, a system in accordance with an embodiment may implement one or more access management frameworks that selectively limits, at least temporarily, access to data. One of these frameworks may be a storage array side framework that manages access to stored data through a reservation process.

To implement the storage array side framework, user reservations, for portions of storage resources utilized to store data, may be implemented by storage arrays. When input-output (IO) is received, the user reservations may be used to process the IO. For example, the user reservations may be used to decide whether and how to process some or all of the IO.

To ensure access to data for periods of time necessary to perform certain types of processes, the user reservations may lock or otherwise limit access to data upon which the processes are performed. Consequently, when IO is obtained that would otherwise modify data, the storage arrays storing the data may at least temporarily reject the IO thereby preserving the data while the user reservation exists.

By doing so, a system in accordance with embodiments disclosed herein may facilitate both storage of data and performance of processes that may rely on access to data for predetermined durations of time. Thus, embodiments disclosed herein may address, among other problems, the technical problem of data access in distributed systems where multiple entities may have authority to modify or otherwise utilize the same data. By implementing user reservation based frameworks, the disclosed system may facilitate data storage and access restrictions for data.

In an embodiment, a method for managing data storage in a distributed system is provided. The method may include obtaining a user reservation for a portion of storage resources of a storage array of the distributed system; identifying an entity that requested that the user reservation be put in place; based on the user reservation, making a first determination regarding whether an existing user reservation for the portion of the storage resources of the storage array exists; in a first instance of the first determination where no existing user reservation for the portion of the storage resources of the storage array exists: granting the user reservation; while the user reservation is granted: obtaining, by the storage array, new input-output; identifying, by the storage array, that the new input-output is directed to the portion of the storage resources of the storage array; and processing, by the storage array, the new input-output based on a scope of protection for the portion of the storage resources defined by the user reservation.

Processing the new input-output may include, in a first instance of the processing where the scope of protection prohibits all input-output: discarding the new input-output; and sending, to an entity that originated the new input-output, a notification indicating that new input-output has been rejected, that the portion of the storage resources are currently unavailable for storage use, and that the portion of the storage resources are operable.

The scope of protection may be based on a protection policy from a group of protection policies consisting of: a first protection policy that prohibits write, authorizes reads, and authorizes queries; a second protection policy that prohibits the write, prohibits the reads, and authorizes the queries; and a third protection policy that prohibits the write, prohibits the reads, and prohibits the queries.

The user reservation may be obtained from a storage management system, the user reservation may specify the portion of the storage resources of the storage array, and the user reservation may specify the scope of the protection.

The scope of protection may be implemented exclusively by the storage array, the new input-output may be originated by a processing complex, and the processing complex may implement a second scope of protection. The second scope of protection may be implemented by the processing complex using masking or masking.

The method may also include, in a second instance of the first determination where the existing user reservation for the portion of the storage resources of the storage array exists: rejecting the user reservation; and providing an indication of a second entity for which the existing user reservation is in place.

The method may also include, obtaining a user release (e.g., a release request for a user reservation) for the portion of storage resources; identifying a third entity that requested the user release; making a second determination regarding whether the third entity and the entity are a same entity; in a first instance of the second determination where the third entity and the entity are the same entity: releasing the granted user reservation; and in a second instance of the second determination where the third entity and the entity are not the same entity: rejecting the user release.

Granting the user reservation may include recording, in a data structure maintained by the storage array: a logical unit number associated with the portion of the storage resources, an identifier of the entity, and information regarding a protection policy that defines the scope of the protection.

Processing the new input-output may include performing a lookup in the data structure based, at least in part, on an identity of a second entity that originated the input-output to identify the scope of the protection; identifying actions to process the new input-output with consideration of the scope of the protection; excluding performance of some of the actions based on the scope of the protection; and performing at least one supplementary action based on the scope of the protection.

In an embodiment, a non-transitory media is provided. The non-transitory media may include instructions that when executed by a processor cause the computer-implemented method to be performed.

In an embodiment, a storage array is provided. The storage array may include the non-transitory media and a processor, and may perform the computer-implemented method when the computer instructions are executed by the processor.

In an embodiment, a data processing system is provided. The data processing system may include the non-transitory media and a processor, and may perform the computer-implemented method when the computer instructions are executed by the processor.

Figure 1:
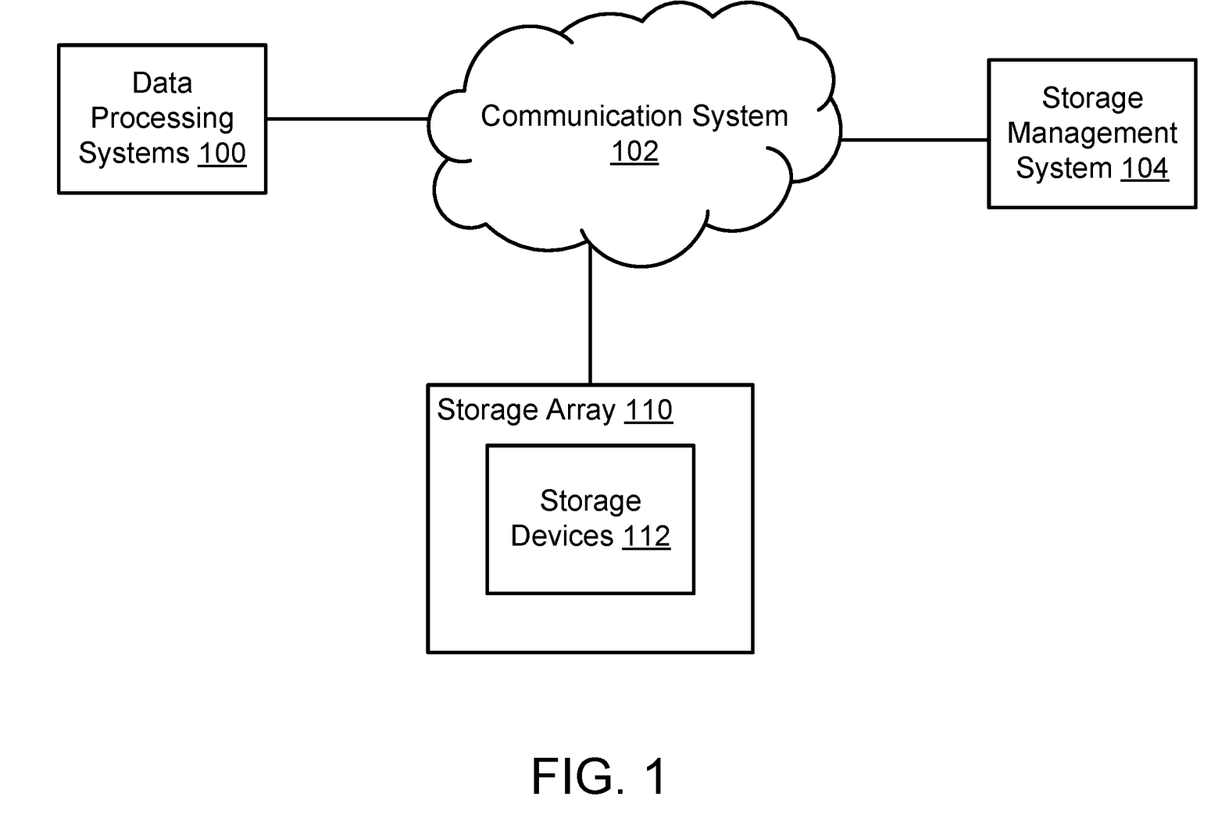
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown), and/or may cooperate with other devices that provide the computer implemented services. Different data processing systems may provide similar and/or different computer implemented services.

For example, any of data processing systems 100 may be members of cloud environments that provides the computer implemented services. The cloud environments may include any number of devices that provide computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

When providing the computer-implemented services, data processing systems 100 may generate, storage, and access stored data. The data may be, in part, stored in storage arrays (e.g., 110). The storage arrays 110 may include any number of storage devices 112 usable to store data. The storage arrays may be part of the data processing systems, or may be separate from the storage arrays.

For example, in a cloud environment the storage arrays may be separate from the data processing systems. In this model, the data processing systems may include processing complexes (e.g., processors, memory modules) that may utilize the storage arrays for storage.

The ability of data processing systems 100 to provide the computer implemented services may depend on the ability to store and retrieve stored data. For example, in a scenario in which a data processing system is provided database services using data stored in a storage array, loss of some of the stored data in the storage array may prevent the database services from being provided.

In general, embodiments disclosed herein may provide methods, systems, and/or devices for managing data storage. To manage data storage, a system in accordance with embodiments disclosed herein may temporarily limit access to data stored in storage arrays. The access may be limited so that various types of operations may be performed that relies on access to data being available for various durations of time. The operations may include, for example, data protection operations such as generating snapshots of data usable to restore instances of the data in the event that some data becomes corrupted, unintentionally deleted, or becomes otherwise inaccessible for other reasons. During these, and other types of operations, it may be presumed that a static copy of the to-be-protected data is available. Consequently, if the data is modified during these operations, then the data protection operations may not be completed successfully.

To temporarily limit access to the data stored in the storage arrays, the system of FIG. 1 may implement one or more access management frameworks. The access management frameworks may include (i) processing complex focused frameworks such as masking where access to data is gated at the storage arrays (e.g., by blocking ports to processing complexes), (ii) network side frameworks such as zoning where access to data in storage arrays is gated at the network layer interconnecting a processing complex and storage arrays (e.g., based on port associations), (iii) storage array side frameworks where processing complexes place reservations on the storage array (e.g., so that only certain processing complexes are able to utilize the storage array), (iv) user reservation based frameworks where users (e.g., rather than processing complexes) are able to limit access to resources of storage arrays, and/or (iv) other types of frameworks. Any of these frameworks may be implemented in isolation or in combination with each other thereby limiting access to data using one or more separate and independent mechanisms.

In contrast to the other frameworks, the user reservation based frameworks may be user centric in that it is driven by users of data processing systems to meet their needs. Thus, a user may be empowered through user reservation requests to actively manage access to data in a distributed system.

To implement the storage array side frameworks (and/or other frameworks), the system may include storage management system 104. Storage management system 104 may (i) obtain requests from users (e.g., of data processing systems 100) to temporarily reserve portions of storage resources of storage arrays (e.g., which may be defined by logical unit numbers used to present portions of storage resources of the storage array to various processing complexes for data storage use), (ii) identify whether the portions of the storage resources of the storage arrays are already subject to existing user reservations, (iii) if not subject to existing user reservations, implement the user reservations for the users, (iv) if subject to existing reservations, reject the requests, and (v) manage release of existing user reservations (e.g., by making sure that the requestor of the releases are the same as those that requested implementation of the user reservations).

The system of FIG. 1 may also include any number of instances of storage array 110. Storage array 110 may provide data storage services, and data access management services cooperatively with storage management system 104.

To provide data storage services, storage array 110 may include any number of storage devices 112 (e.g., hard disk drives, solid state drives, tape drives, etc.). Storage array 110 may also include controllers and/or other devices usable to manage the storage resources of the storage devices. For example, the controllers and/or other devices may provide redundant array of disk (RAID) services, caching services, health monitoring services, migration services, and/or other types of services to manage storage of data in storage devices 112.

Storage array 110 may implement a management layer that divides the storage resources (e.g., addressable storage space) of storage devices 112 into various portions. These portions of storage resources be assigned logical unit numbers (LUNs), and presented to processing complexes (or other types of collections of hardware components) for use in performance of computer implemented services. The processing complexes (or software hosted by the processing complexes, such as operating systems) may utilize the LUNs to mount addressable storage space (e.g., logical address space) usable for data storage. Thus, from the perspective of the processing complexes, input-output (IO) may be directed to the mounted addressable storage space. When received by storage array 110, the IO may be processed through address translation (e.g., logical to physical) to identify how to read/write data in the storage resources of storage array 110 based on the IO.

To provide data access management services cooperatively with storage management system 104, the management layer of storage array 110 may limit access to storage resources based on user reservations. A user reservation may restrict access to portions of storage resources of storage array 110.

For example, a user reservation may (i) indicate a portion of the storage resources that are reserved using a LUN, (ii) indicate an entity for which the portion of the storage resources are reserved, and (iii) indicate a protection policy that defines the scope of protection for the portion of the storage resources.

The protection policies may specify various limitations for portions of storage resources such as (i) whether write access is restricted, (ii) whether read access is restricted, and (iii) whether querying (e.g., accessing metadata regarding the portion of the storage resources) is restricted.

When IO is obtained by storage array 110, the IO may be processed based on the user reservations. Consequently, when IO is obtained, it may be rejected or processed in part depending on the user reservations for the portions of storage resources to which the IO is directed.

Figure 2A:
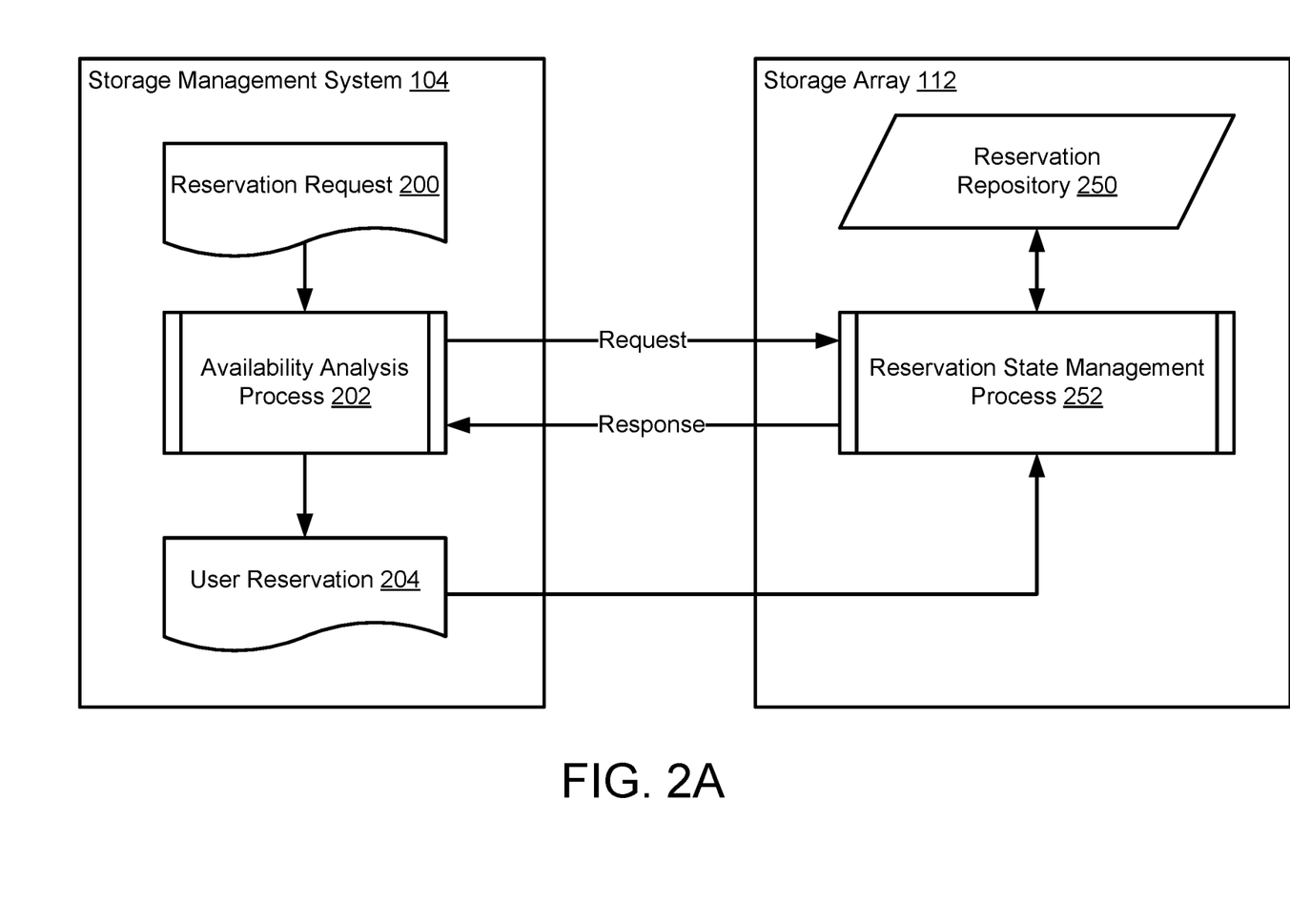
FIGS. 2A-2B show diagrams illustrating data flows in accordance with an embodiment.
Figure 2B:
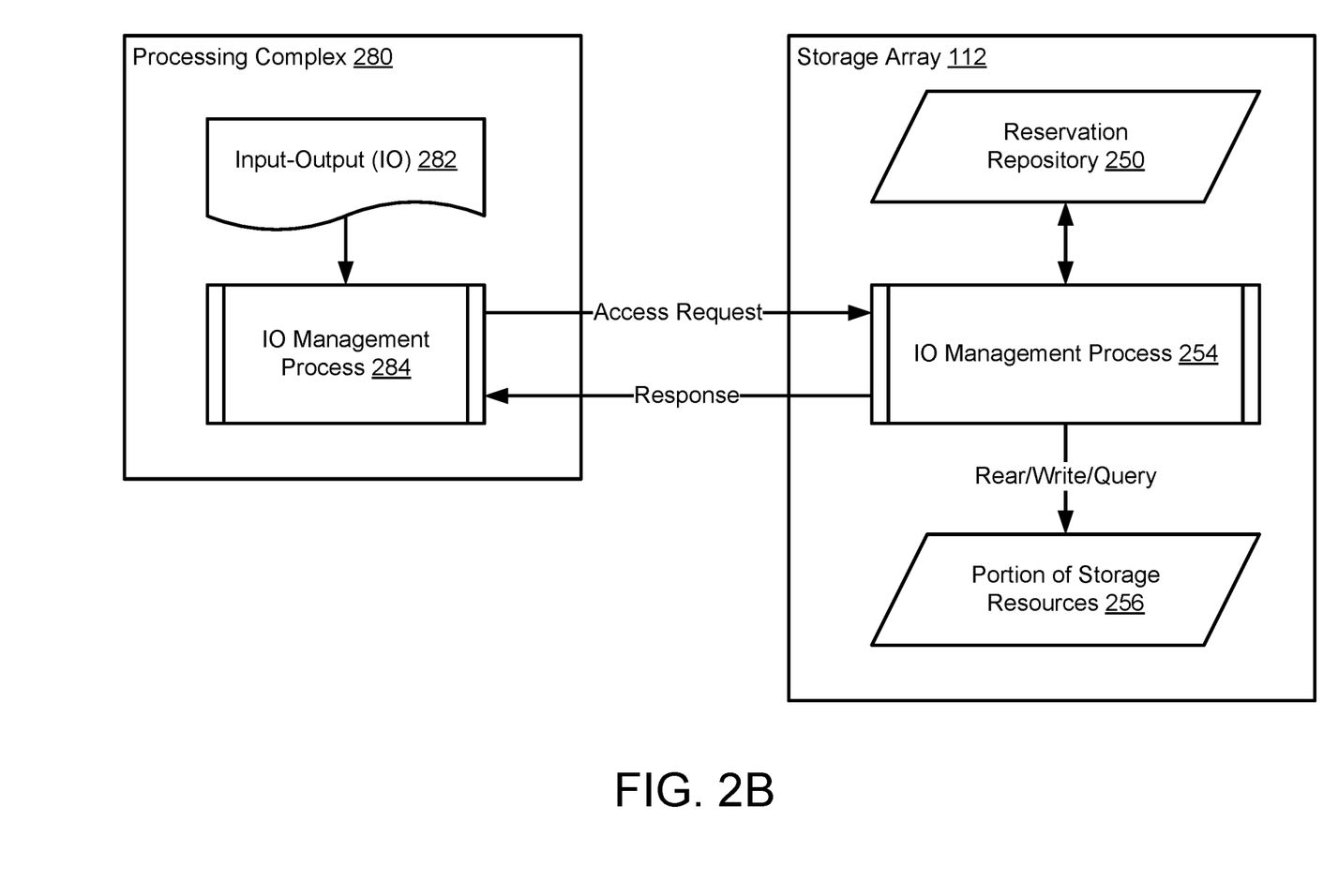

Refer to FIGS. 2A-2B for additional details regarding establishing user reservations, and processing IO based on user reservations.

Figure 3:
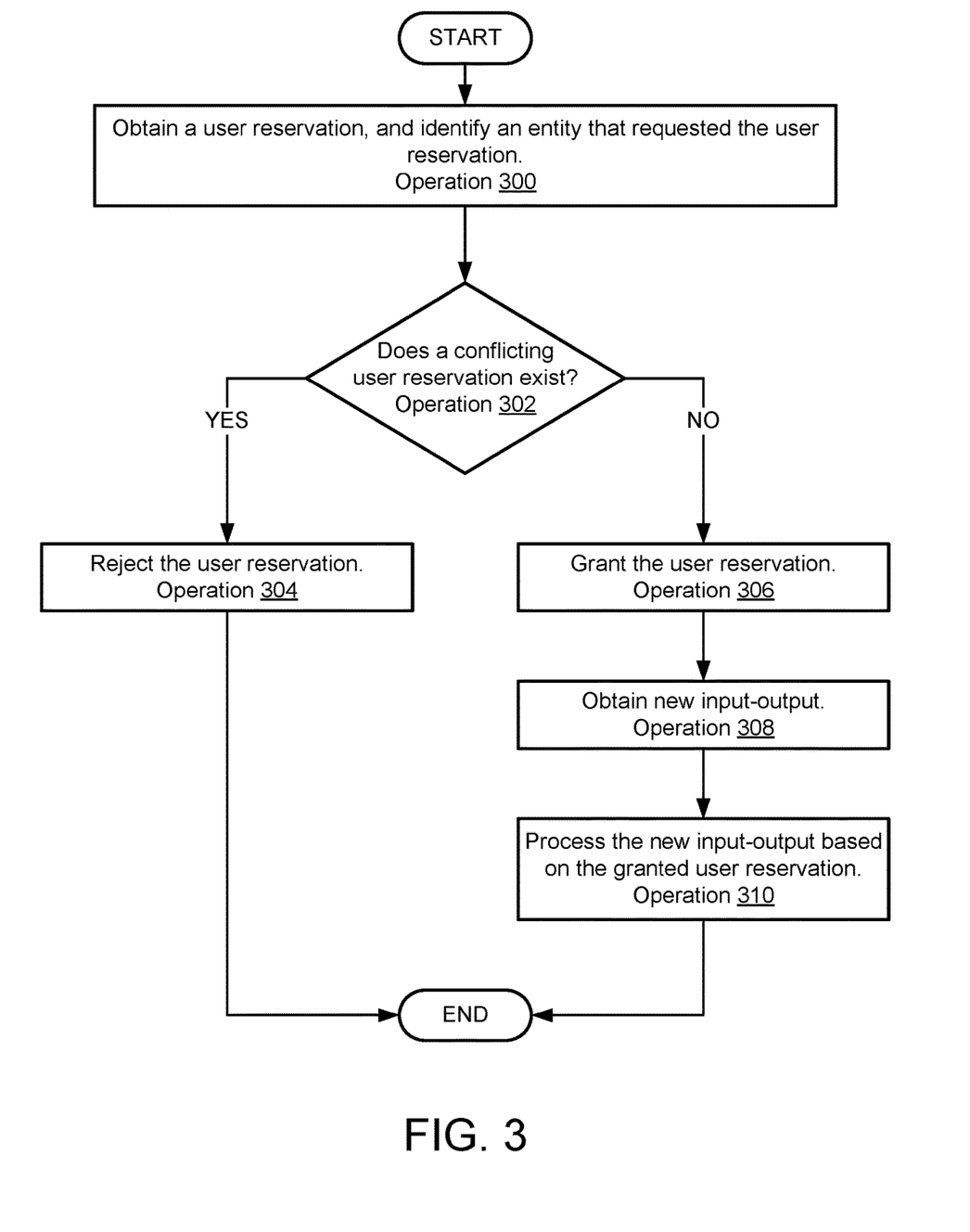
FIG. 3 shows a flow diagram illustrating a method of managing data storage in accordance with an embodiment.

When providing their functionality, any of data processing system 100, storage management system 104, and storage array 110 may perform all, or a portion, of the method illustrated in FIG. 3.

Any of data processing systems 100, storage management system 104, and storage array 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, communication system 102 include one or more Small Computer System Interface (SCSI) links. The SCSI links may facilitate communications between the processing complexes (e.g., of data processing systems 100) and storage array 110.

While illustrated in FIG. 1 as including a limited number of specific components, a system in accordance with an embodiment may include fewer, additional, and/or different components than those illustrated therein.

To further clarify embodiments disclosed herein, diagrams illustrating data flows that may be implemented by the system of FIG. 1 are shown in FIGS. 2A-2B.

Turning to FIG. 2A, a first data flow diagram in accordance with an embodiment is shown.

To manage user reservations, storage management system 104 a reservation request (e.g., 200). To do so, storage management system 104 may present a user with an interface (e.g., a graphical user interface) through which the user may provide user feedback. The user feedback may be used to obtain reservation request 200. Reservation request 200 may indicate a portion of the storage resources to be reserved for a period of time, an extent of the reservation (e.g., which protection policy to implement), and the entity requesting that the user reservation.

Reservation request 200 may be processed by availability process 202 to ascertain whether the user reservation may be implemented. During availability process 202, storage management system 104 may query the storage array (e.g., 112) regarding whether the portions of the storage resources is already subject to a reservation.

For example, a request may be forwarded to reservation state management process 252. Upon receipt, reservation state management process 252 may analyze the user reservations recorded in reservation repository 250 to identify whether an existing user reservation for the portion of the storage resources (e.g., associated with a LUN) is already subject to a user reservation. Based on the analysis, reservation state management process 252 may send a response to storage management system 104 reflect whether reservation request 200 may be implemented (e.g., if no existing user reservation for the portion of resources exists).

If reservation request 200 may be implemented, user reservation 204 may be sent to reservation state management process 252, which may record the user reservation in reservation repository 250.

User reservation 204 may indicate, for example, the LUN that identifies the portion of the storage resources, the scope of protection (e.g., by using a protection policy identifier), and the entity that requested user reservation 204 be put in place.

Turning to FIG. 2B, a second data flow diagram in accordance with an embodiment is shown. In FIG. 2B, processing complex 280 may be a portion of a data processing system. Processing complex 280 may use a portion of storage resources of storage array 110 to store data used to provide computer implemented services.

To manage data storage, processing complex 280 may, when IO 282 is generated (e.g., via operation of applications or other software which may provide computer implemented services), process the IO using IO management process 284. During IO management process 284, the IO may be packaged and forwarded to storage array 110 (e.g., as part of one or more access requests).

When received by storage array 110, the access requests may be processed by IO management process 254. During IO management process 254, information regarding user reservations in reservation repository 250 may be used to determine how to process the IO.

If no user reservations impacting IO 282 are present, then the IO may be processed normally. For example, address translations may be performed to establish read/writes to various storage devices that contribute to portion of the storage resources 256.

However, if a user reservation impacts IO 282, then IO 282 may be subject to modified processing. For example, the IO may be rejected, and a response indicating the basis rejection of the IO (all or a portion) may be provided back to processing complex 280.

The response may indicate, for example, that the portion of the storage resources are not currently available, but that they are otherwise available. Accordingly, processing complex 280 may continue to use the portion of the storage resources rather than treating the portion of the storage resources as being impaired.

In an embodiment, any of storage management system 104, processing complex 280, and/or storage array 110 are implemented using a hardware device including circuitry. The hardware device may be, for example, a digital signal processor, a field programmable gate array, or an application specific integrated circuit. The circuitry may be adapted to cause the hardware device to perform the functionality of storage management system 104, processing complex 280, and/or storage array 110 as discussed herein. Storage management system 104, processing complex 280, and/or storage array 110 may be implemented using other types of hardware devices without departing embodiment disclosed herein.

In an embodiment, any of storage management system 104, processing complex 280, and/or storage array 110 are implemented using a processor adapted to execute computing code stored on a persistent storage that when executed by the processor performs the functionality of storage management system 104, processing complex 280, and/or storage array 110 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of storage management system 104, processing complex 280, and/or storage array 110 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed herein. Any of these data structures may be implemented using, for example, lists, tables databases, linked lists, unstructured data, and/or other types of data structures.

As discussed above, the components of FIG. 1 may perform various methods to manage data storage for data processing systems. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing data storage in accordance with an embodiment is shown. The method may be performed by any of data processing systems 100, storage management system 104, storage array 110, and/or other components of the system shown in FIG. 1.

At operation 300, a user reservation is obtained, and an entity that requested the user reservation is identified. The user reservation may be obtained by receiving a request from a storage management system. The storage management system may generate and send the request at the request of the entity. The request may indicate the user reservation (e.g., may specify a LUN, requestor, protection policy to be implemented, etc.) may indicate the entity that initiated the request for the user reservation.

At operation 302, a determination is made regarding whether a conflicting user reservation exists. The determination may be made by performing a search using the LUN of the user reservation. The search may indicate whether any existing user reservations for the portion of the storage resources associated with the LUN exists. If an existing user reservation exists, then it may be determined that a conflicting user reservation (e.g., with respect to the user reservation of operation 300) exists.

If a conflicting reservation exists, then the method may proceed to operation 304. Otherwise, the method may proceed to operation 306.

At operation 304, the user reservation is rejected. The user reservation may be rejected by discarding it and not implementing the user reservation.

The method may end following operation 304.

Returning to operation 302, the method may proceed to operation 306 following operation 302 if no conflicting user reservations exist.

At operation 306, the user reservation is granted. The user reservation may be granted by, for example, recording the user reservation in a repository of existing user reservations. Once recorded, the user reservation may be maintained until a release request for the user reservation is initiated by the entity that the user reservation be put in place. Consequently, once in place, only the requestor of the user reservation may release it.

In an embodiment, the user reservation may also be released based on a hierarchical credentialing system. The hierarchical credentialing system may define a hierarchy with respect to different entities. Entities higher in the hierarchy may have authority to release user reservations put in place for entities lower in the hierarchy.

At operation 308, new IO is obtained. The new IO may be obtained by receiving it from a processing complex that utilizes the portion of the storage resources associated with the LUN indicated by the user reservation.

At operation 310, the new IO is processed based on the granted user reservation. The new IO may be processed by enforcing a scope of protection indicated by the user reservation. For example, a protection policy indicated by the user reservation may define the scope of protection. Consequently, depending on the scope of the protection, one or more actions (e.g., reads/writes) that may otherwise be performed to process the new IO in the absence of the scope of protection may not be performed, and one or more supplementary actions that may otherwise not be performed to process the new IO in the absence of the scope of protection may also be performed. The supplementary actions may include, for example, sending a response to the processing complex indicating that a reservation-conflict check condition exists. This response may indicate to the processing complex that the portion of the storage resources are currently unavailable for use, but are not otherwise impaired. When received by the processing complex, the processing complex may queue the IO for resending to the storage array at a future point in time or may perform other actions that in accordance with a belief that no special action needs to be taken with respect to the storage array and future ability to utilize the storage array.

The method may end following operation 310.

Using the method illustrated in FIG. 3, a system in accordance with embodiments may manage data storage to ensure that access to data for predetermined periods of time is maintained. By doing so, processes that rely on access to data for the predetermined period of time may be more likely to successfully complete their operations. For example, in the context of backup, static data structures may be maintained so that snapshot generation processes may be more likely to complete successfully.

Figure 4:
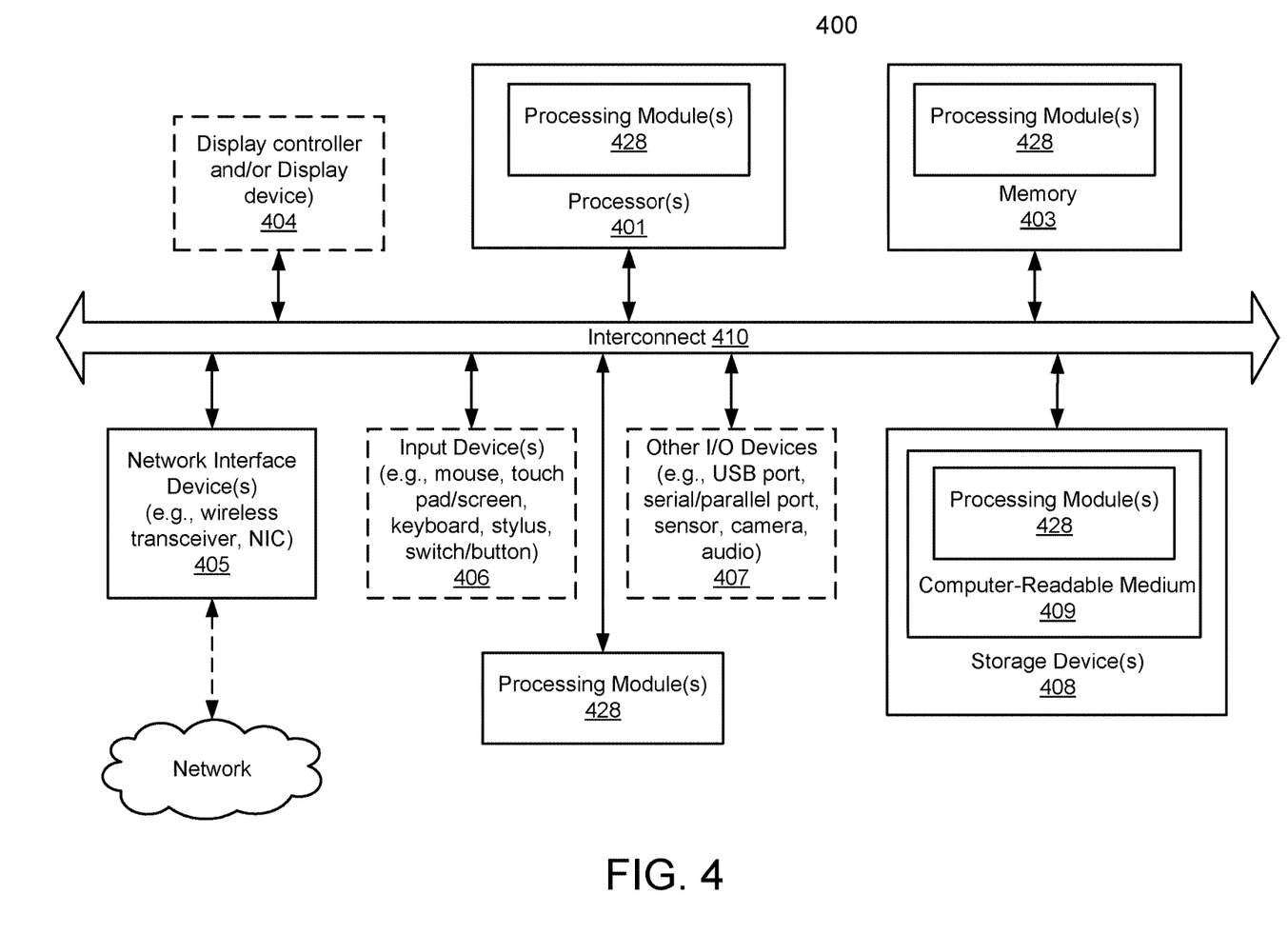
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data storage in a distributed system, the method comprising:
    obtaining a user reservation request comprising a user reservation for a portion of storage resources of a storage array of the distributed system, the user reservation request further comprises a scope of protection for the portion of the storage resources associated with the user reservation;
    identifying an entity that requested that the user reservation be put in place;
    based on the user reservation, making a first determination regarding whether an existing user reservation for the portion of the storage resources of the storage array exists;
    in a first instance of the first determination where no existing user reservation for the portion of the storage resources of the storage array exists:
        granting the user reservation;
        while the user reservation is granted:
            obtaining, by the storage array, new input-output data to be stored into or read from the portion of the storage resources for which the user reservation is granted;
            identifying, by the storage array, that the new input-output data is directed to the portion of the storage resources of the storage array; and
            processing, by the storage array, the new input-output data based on the scope of protection for the portion of the storage resources defined by the user reservation.

2. The method of claim 1, wherein processing the new input-output data comprises:
    in a first instance of the processing where the scope of protection prohibits all input-output:
        discarding the new input-output data; and
        sending, to an entity that originated the new input-output data, a notification indicating that new input-output data has been rejected, that the portion of the storage resources are currently unavailable for storage use, and that the portion of the storage resources are operable.

3. The method of claim 2, wherein
    the scope of protection is based on at least one of a protection policy selected from a group of protection policies consisting of:
        a first protection policy that prohibits write, authorizes reads, and authorizes queries;
        a second protection policy that prohibits the write, prohibits the reads, and authorizes the queries; and
        a third protection policy that prohibits the write, prohibits the reads, and prohibits the queries, amd
    the user reservation request comprises the at least one of the protection policy.

4. The method of claim 1, wherein the user reservation request is obtained from a storage management system, the user reservation request specifies the portion of the storage resources of the storage array.

5. The method of claim 4, wherein the scope of protection is implemented exclusively by the storage array, the new input-output data is originated by a processing complex, and the processing complex implements a second scope of protection.

6. The method of claim 5, wherein the second scope of protection is implemented by the processing complex using masking or zoning.

7. The method of claim 1, further comprising:
in a second instance of the first determination where the existing user reservation for the portion of the storage resources of the storage array exists:
rejecting the user reservation; and
providing an indication of a second entity for which the existing user reservation is in place.

8. The method of claim 1, further comprising:
obtaining a user release for the portion of storage resources;
identifying a third entity that requested the user release;
making a second determination regarding whether the third entity and the entity are a same entity;
in a first instance of the second determination where the third entity and the entity are the same entity:
releasing the granted user reservation; and
in a second instance of the second determination where the third entity and the entity are not the same entity:
rejecting the user release.

9. The method of claim 1, wherein granting the user reservation comprises:
recording, in a data structure maintained by the storage array:
a logical unit number associated with the portion of the storage resources,
an identifier of the entity, and
information regarding a protection policy that defines the scope of the protection.

10. The method of claim 1, wherein processing the new input-output data comprises:
performing a lookup in a data structure maintained by the storage array, the lookup being based, at least in part, on an identity of a second entity that originated the input-output data to identify the scope of the protection;
identifying actions to process the new input-output data with consideration of the scope of the protection;
excluding performance of some of the actions based on the scope of the protection; and
performing at least one supplementary action based on the scope of the protection.

11. A non-transitory machine-readable medium having instructions stored therein, which when executed by a processor, cause the processor to perform operations for managing data storage in a distributed system, the operations comprising:
obtaining a user reservation request coprising a user reservation for a portion of storage resources of a storage array of the distributed system, the user reservation request further comprises a scope of protection for the portion of the storage resources associated with the user reservation;
identifying an entity that requested that the user reservation be put in place;
based on the user reservation, making a first determination regarding whether an existing user reservation for the portion of the storage resources of the storage array exists;
in a first instance of the first determination where no existing user reservation for the portion of the storage resources of the storage array exists:
granting the user reservation;
while the user reservation is granted:
obtaining, by the storage array, new input-output data to be stored into or read from the portion of the storage resources for which the user reservation is granted;
identifying, by the storage array, that the new input-output data is directed to the portion of the storage resources of the storage array; and
processing, by the storage array, the new input-output data based on a scope of protection for the portion of the storage resources defined by the user reservation.

12. The non-transitory machine-readable medium of claim 11, wherein processing the new input-output data comprises:
in a first instance of the processing where the scope of protection prohibits all input-output data:
discarding the new input-output data; and
sending, to an entity that originated the new input-output data, a notification indicating that new input-output data has been rejected, that the portion of the storage resources are currently unavailable for storage use, and that the portion of the storage resources are operable.

13. The non-transitory machine-readable medium of claim 12, wherein
the scope of protection is based on at least one of a protection policy selected from a group of protection policies consisting of:
a first protection policy that prohibits write, authorizes reads, and authorizes queries;
a second protection policy that prohibits the write, prohibits the reads, and authorizes the queries; and
a third protection policy that prohibits the write, prohibits the reads, and prohibits the queries, and
the user reservation request comprises the at least one of the protection policy.

14. The non-transitory machine-readable medium of claim 11, wherein the user reservation request is obtained from a storage management system, the user reservation request specifies the portion of the storage resources of the storage array.

15. The non-transitory machine-readable medium of claim 14, wherein the scope of protection is implemented exclusively by the storage array, the new input-output data is originated by a processing complex, and the processing complex implements a second scope of protection.

16. A storage array, comprising:
a processor; and
a memory coupled to the processor to store instructions, which when executed by the processor, cause the processor to perform operations, the operations comprising:
obtaining a user reservation for a portion of storage resources of the storage array;
identifying an entity that requested that the user reservation be put in place;
based on the user reservation, making a first determination regarding whether an existing user reservation for the portion of the storage resources of the storage array exists;
in a first instance of the first determination where no existing user reservation for the portion of the storage resources of the storage array exists:
granting the user reservation;
while the user reservation is granted:

obtaining new input-output data to be stored into or read from the portion of the storage resources for which the user reservation is granted;

identifying that the new input-output data is directed to the portion of the storage resources; and processing the new input-output data based on a scope of protection for the portion of the storage resources defined by the user reservation.

17. The storage array of claim 16, wherein processing the new input-output data comprises:

in a first instance of the processing where the scope of protection prohibits all input-output data:

discarding the new input-output data; and sending, to an entity that originated the new input-output data, a notification indicating that new input-output data has been rejected, that the portion of the storage resources are currently unavailable for storage use, and that the portion of the storage resources are operable.

18. The storage array of claim 17, wherein the scope of protection is based on at least one of a protection policy selected from a group of protection policies consisting of:

a first protection policy that prohibits write, authorizes reads, and authorizes queries;

a second protection policy that prohibits the write, prohibits the reads, and authorizes the queries; and a third protection policy that prohibits the write, prohibits the reads, and prohibits the queries, and the user reservation request comprises the at least one of the protection policy.

19. The storage array of claim 16, wherein the user reservation request is obtained from a storage management system, the user reservation request specifies the portion of the storage resources of the storage array.

20. The method of claim 1, further comprising:

obtaining a user release for the portion of storage resources for which the user reservation is granted;

identifying a third entity that requested the user release; and granting or rejecting the user release based on determining whether the entity and the third entity are a same entity.

* * * * *

UNITED STATES PATENT AND TRADEMARK OFFICE
CERTIFICATE OF CORRECTION

PATENT NO. : 12,282,588 B2  
APPLICATION NO. : 18/157259  
DATED : April 22, 2025  
INVENTOR(S) : Shoham Levy et al.

Page 1 of 1

It is certified that error appears in the above-identified patent and that said Letters Patent is hereby corrected as shown below:

In the Claims

Claim 3, Column 14, Line 56: The word "amd" should instead be -- and --.

Claim 11, Column 15, Line 51: The word "coprising" should instead be -- comprising --.

Signed and Sealed this
Twenty-fourth Day of June, 2025

Coke Morgan Stewart
*Acting Director of the United States Patent and Trademark Office*